United States Patent
Wu

(10) Patent No.: US 10,049,256 B2
(45) Date of Patent: Aug. 14, 2018

(54) FINGERPRINT SENSING MODULE

(71) Applicant: Gingy Technology Inc., Hsinchu (TW)

(72) Inventor: Jen-Chieh Wu, Hsinchu (TW)

(73) Assignee: Gingy Technology Inc., Hsinchu (TW)

( * ) Notice: Subject to any disclaimer, the term of this patent is extended or adjusted under 35 U.S.C. 154(b) by 61 days.

(21) Appl. No.: 15/239,842

(22) Filed: Aug. 18, 2016

(65) Prior Publication Data
US 2017/0169273 A1    Jun. 15, 2017

Related U.S. Application Data

(60) Provisional application No. 62/266,002, filed on Dec. 11, 2015.

(30) Foreign Application Priority Data

Jul. 18, 2016 (TW) .............................. 105122567 A

(51) Int. Cl.
*G06K 9/00* (2006.01)
(52) U.S. Cl.
CPC ....... *G06K 9/0004* (2013.01); *G06K 9/00053* (2013.01); *G06K 9/00087* (2013.01)
(58) Field of Classification Search
CPC ............ G09K 9/0004; G09K 9/00053; G09K 2009/0006
See application file for complete search history.

(56) References Cited

U.S. PATENT DOCUMENTS

| 5,177,802 A | 1/1993 | Fujimoto et al. |
| 2016/0132712 A1* | 5/2016 | Yang .................... G06K 9/0002 348/77 |
| 2016/0224816 A1* | 8/2016 | Smith .................... G02B 27/58 |

FOREIGN PATENT DOCUMENTS

| CN | 104849870 | 8/2015 |
| JP | 2003141514 | 5/2003 |
| TW | 201032146 | 9/2010 |
| TW | 201310299 | 3/2013 |

OTHER PUBLICATIONS

"Office Action of Taiwan Counterpart Application", dated Mar. 16, 2018, p. 1-p. 5.

* cited by examiner

*Primary Examiner* — Michael Pervan
(74) *Attorney, Agent, or Firm* — JCIPRNET

(57) ABSTRACT

A fingerprint sensing module adapted to sense fingerprint of user's finger is provided. The fingerprint sensing module includes a sensing device, an optical cover and an optical-collimating layer located between the sensing device and the optical cover. The sensing device includes a sensing surface, and the optical-collimating layer covers the sensing surface. The optical-collimating layer includes light-blocking areas and light-transmitting areas, and each of the light-transmitting area is surrounded by a part of the light-blocking areas. The optical cover is disposed on the optical-collimating layer, and the optical cover is adapted to contact the user's finger, and the optical cover is adapted to transmit a sensing light from the user's finger to the optical-collimating layer, and the light-blocking areas are adapted to block a portion of the sensing light, and another portion of the sensing light is transmitted to the sensing surface through the light-transmitting areas.

9 Claims, 3 Drawing Sheets

FINGERPRINT SENSING MODULE

CROSS-REFERENCE TO RELATED APPLICATION

This application claims the priority benefits of U.S. provisional application Ser. No. 62/266,002, filed on Dec. 11, 2015 and Taiwan application serial no. 105122567, filed on Jul. 18, 2016. The entirety of each of the above-mentioned patent applications is hereby incorporated by reference herein and made a part of this specification.

BACKGROUND OF THE INVENTION

Field of the Invention

The invention relates to a sensing device, and particularly relates to a fingerprint sensing module.

Description of Related Art

In a conventional identity recognition technique, fingerprint recognition is, for example, implemented by pressing ink by a finger for transferring to a paper to form a fingerprint pattern, and then inputting the fingerprint pattern into a computer through optical scanning to establish a file or implement comparison. The above fingerprint recognition method has a disadvantage of none real-time processing, and cannot satisfy the demand for real-time identity recognition in today's society. Therefore, electronic fingerprint sensing devices become a main stream of technologies development.

An existing electronic fingerprint sensing device is, for example, to use a light source to emit a light to irradiate a finger surface, and then sense the light reflected by the finger surface by using an optical sensing device. Since one point on the finger surface may reflect the light to a plurality of positions of the optical sensing device, one position of the optical sensing device may simultaneously receive images from a plurality of positions of the finger surface, such that the optical sensing device may sense a blur image, and is easy to cause an error judgement.

SUMMARY OF THE INVENTION

The invention is directed to a fingerprint sensing module, which is adapted to more accurately record a fingerprint image of a user.

An exemplary embodiment of the invention provides a fingerprint sensing module adapted to sense a fingerprint of a finger of a user. The fingerprint sensing module includes a sensing device, an optical cover and an optical-collimating layer disposed between the optical cover and the sensing device. The sensing device includes a sensing surface, and the optical-collimating layer covers the sensing surface. The optical-collimating layer includes light-blocking areas and light-transmitting areas, and each of the light-transmitting areas is surrounded by a part of the light-blocking areas. The optical cover is disposed on the optical-collimating layer, and the optical cover is adapted to contact the user's finger, and the optical cover is adapted to transmit a sensing light from the user's finger to the optical-collimating layer, and the light-blocking areas are adapted to block a portion of the sensing light, and another portion of the sensing light is transmitted to the sensing surface through the light-transmitting areas.

In an exemplary embodiment of the invention, the sensing device further includes a plurality of sensing units, the sensing units are arranged on the sensing surface, and each of the light-transmitting areas corresponds to one of the sensing units.

In an embodiment of the invention, a refractive index of a material of the optical cover is the same to a refractive index of a material of the light-transmitting areas.

In an exemplary embodiment of the invention, the light-blocking areas and the light-transmitting areas are arranged in alternation on the sensing surface along a first direction and a second direction, the first direction is perpendicular to the second direction, and the first direction and the second direction are all perpendicular to a normal of the sensing surface.

In an exemplary embodiment of the invention, a width of the light-transmitting areas in the first direction is smaller than or equal to a width of the sensing units in the first direction, and a width of the light-transmitting areas in the second direction is smaller than or equal to a width of the sensing units in the second direction.

In an exemplary embodiment of the invention, the optical cover further includes a connection surface and a contact surface. The contact surface is adapted to contact the user's finger, and the connection surface is connected to the optical-collimating layer, the sensing surface is connected to the optical-collimating layer, and the contact surface, the connection surface and the sensing surface are parallel to each other.

In an exemplary embodiment of the invention, the optical-collimating layer and the optical cover are complied with $$\frac{h_1}{2} \leq h_2 \leq h_1,$$

where $h_1$ and $h_2$ are respectively heights of the optical cover and the optical-collimating layer along a direction parallel to the normal of the sensing surface.

In an exemplary embodiment of the invention, the fingerprint sensing module further includes at least one light-emitting unit, and the light-emitting unit is adapted to send the sensing light to a surface of the finger of the user.

In an exemplary embodiment of the invention, the optical-collimating layer further includes a plurality of optical-collimating sheets stacked along a normal direction of the sensing surface, and each of the optical-collimating sheets includes a plurality of light-transmitting portions and a plurality of light-blocking portions. Each of the light-transmitting portions is located at one of the light-transmitting areas, and each of the light-blocking portions is located at one of the light-blocking areas.

In an exemplary embodiment of the invention, the fingerprint sensing module further includes a plurality of light-blocking sheets, and the light-blocking sheets are disposed on the light-blocking portions of the optical-collimating sheets at a side away from the optical cover.

In an exemplary embodiment of the invention, the light-blocking areas of the optical-collimating layer are adapted to absorb the sensing light.

According to the above descriptions, since the fingerprint sensing module of the invention has the optical-collimating layer disposed between the optical cover and the sensing device, when the user's finger is placed on the optical cover, the sensing device may accurately sense a fingerprint image of the finger of the user.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
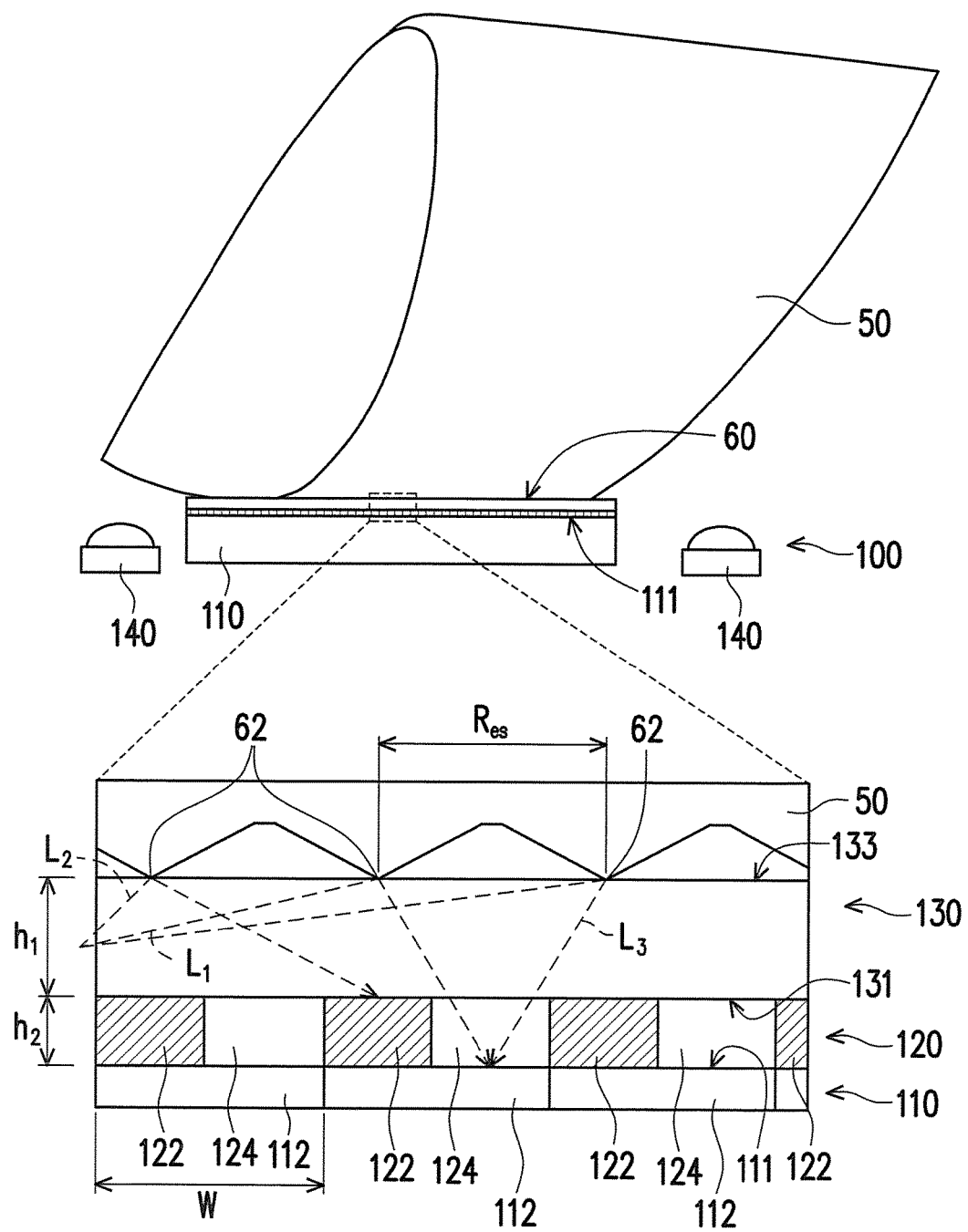
FIG. 1 is a schematic diagram and a partially enlarged view of a fingerprint sensing module according to a first embodiment of the invention.

FIG. 1 is a schematic diagram and a partially enlarged view of a fingerprint sensing module according to a first embodiment of the invention. Referring to FIG. 1, the fingerprint sensing module 100 is adapted to sense a fingerprint 60 of a finger of a user 50, and the fingerprint sensing module 100 includes a sensing device 110, an optical cover 130 and an optical-collimating layer 120 disposed between the optical cover 130 and the sensing device 110. The sensing device 110 includes a sensing surface 111, and the optical-collimating layer 120 covers the sensing surface 111. In other words, in the fingerprint sensing module 100 of the present exemplary embodiment, a light is adapted to be transmitted from the optical cover 130 to the sensing device 110, and the light has to pass through the optical-collimating layer 120 before being transmitted to the sensing device 110.

The optical-collimating layer 120 of the present exemplary embodiment includes a plurality of light-blocking areas 122 and a plurality of light-transmitting areas 124, and each of the light-transmitting areas 124 is surrounded by a part of the light-blocking areas 122, i.e. each of the light-transmitting areas 124 is surrounded by a plurality of light-blocking areas 122.

The optical cover 130 of the present embodiment is disposed on the optical-collimating layer 120, and the optical cover 130 is adapted to contact the finger of the user 50, and the fingerprint 60 of the user 50 can be pressed on the optical cover 130.

The optical cover 130 of the present embodiment is adapted to transmit sensing lights $L_1$, $L_2$ and $L_3$ from the finger of the user 50 to the optical-collimating layer 120, and the light-blocking areas 122 of the optical-collimating layer 120 are adapted to block a portion of the sensing lights (for example, the sensing light $L_2$), and another portion of the sensing lights (for example, the sensing lights $L_1$, $L_3$) is transmitted to the sensing surface 111 through the light-transmitting areas 124.

In the fingerprint sensing module 100 of the present embodiment, since each of the light-transmitting areas 124 of the optical-collimating layer 120 is surrounded by the light-blocking areas 122, the light-blocking areas 122 surrounding the light-transmitting area 124 may control the sensing light received by a part of the sensing surface 111 under the light-transmitting area 124 surrounded by the light-blocking areas 122, and prevent scattered lights coming from other places of the fingerprint 60 from being transmitted to the part of sensing surface 111 under the aforementioned light-transmitting area 124. In other words, if the incident angle of the sensing light propagates to the optical-collimating layer 120 of the present embodiment is too large, the light-blocking areas 122 of the optical-collimating layer 120 may block the above sensing light with large incident angle, such that the sensing device 110 may accurately receive images coming from different positions of the fingerprint 60, and sensing accuracy of the fingerprint sensing module 100 is improved. Further, the fingerprint 60 of the user 50 has a plurality of peaks 62, and the fingerprint sensing module 100 of the present embodiment allows the sensing surface 111 under each of the light-transmitting areas 124 to receive the sensing lights $L_1$, $L_3$ coming from less than two peaks 62 of the fingerprint 60, such that the sensing device 110 may sense one fingerprint image or fingerprint information that is easy to be recognized.

To be specific, referring to the enlarged view of FIG. 1, the sensing device 110 of the present embodiment includes a plurality of sensing units 112, where the sensing units 112 are arranged on the sensing surface 111, and each of the light-transmitting areas 124 corresponds to one of the sensing units 112. In other words, the light-transmitting areas 124 of the present embodiment cover the sensing units 112, and the sensing units 112 may receive the sensing light through the light-transmitting areas 124. On the other hand, the light-blocking areas 122 may prevent the sensing units 112 from receiving the sensing lights coming from the fingerprint 60 located at a farther area, so as to ensure that the sensing units 112 may receive the sensing lights coming from the fingerprint 60 located at an adjacent area right above the sensing unit 112, and the fingerprint sensing module 100 may accurately sense an image signal of the fingerprint 60 of the user 50.

Referring to FIG. 1, in detail, the fingerprint sensing module 100 of the present embodiment further includes a light-emitting unit 140, and the light-emitting unit 140 is adapted to send the sensing light to a surface (i.e. the fingerprint 60) of the finger of the user 50. The light-emitting unit 140 of the present embodiment is, for example, adapted to send the sensing light with a wavelength in a visible light spectrum or an invisible light spectrum to the fingerprint 60 of the user 50, and the sensing device 110 is adapted to receive lights with a wavelength the same or similar to that of the sensing light.

Further, the light-blocking areas 122 of the optical-collimating layer 120 of the present embodiment are adapted to absorb the sensing light, i.e. the light-blocking areas 122 are adapted to absorb lights with a wavelength the same or similar to that of the sensing light, such that the fingerprint sensing module 100 may provide accurate fingerprint sensing.

To be specific, the sensing device 110 of the present embodiment is, for example, an image sensor such as a charge-coupled device (CCD) or a complementary metal-oxide semiconductor (CMOS), and the sensing units 112 are, for example, sensing pixels on the image sensor, though the invention is not limited thereto. In other embodiments, the sensing units 112 can be closely arranged on the sensing surface 111 covered by the optical-collimating layer 120, i.e. the optical-collimating layer 120 of the present embodiment can be used in collaboration with various image sensors to provide a good fingerprint sensing effect.

Figure 2:
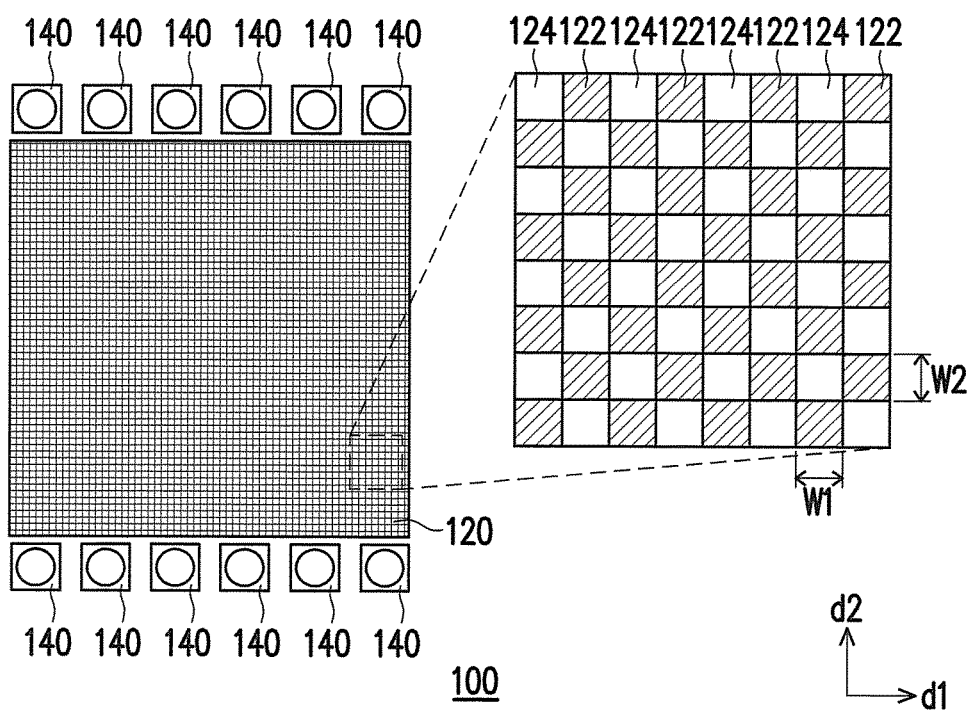
FIG. 2 is a top view of a fingerprint sensing module according to the first embodiment of the invention.

FIG. 2 is a top view of a fingerprint sensing module according to the first embodiment of the invention. In order to clearly describe positions and relative relations of various components of the present embodiment, the optical cover of the fingerprint sensing module is omitted. Referring to FIG. 2, in the first embodiment of the invention, the light-blocking areas 122 and the light-transmitting areas 124 of the optical-collimating layer 120 are arranged in alternation on the sensing surface 111 along a first direction d1 and a second direction d2, where the first direction d1 is perpendicular to the second direction d2, and the first direction d1 and the second direction d2 are all perpendicular to a normal of the sensing surface 111. In other words, each of the light-transmitting areas 124 of the present embodiment is located between two light-blocking areas 122 in the first direction d1, and each of the light-transmitting areas 124 is located between two light-blocking areas 122 in the second direction d2, so that the light-blocking areas 122 and the light-transmitting areas 124 are arranged in a chessboard-type manner. Since each of the light-transmitting areas 124 of the optical-collimating layer 120 is surrounded by four light-blocking areas 122, the sensing light can be more accurately transmitted to the sensing surface 110 from the fingerprint 60, so as to provide a good fingerprint sensing effect.

Referring to FIG. 2, the light-emitting units 140 of the present embodiment are, for example, disposed at two sides of the optical-collimating layer 120, the optical cover 130 and the sensing device 110, though the invention is not limited thereto. In other embodiments, the light-emitting units 140 can be further disposed at corners, periphery or a combination thereof around the optical-collimating layer 120, the optical cover 130 and the sensing device 110.

On the other hand, a refractive index of a material of the optical cover 130 is the same to a refractive index of a material of the light-transmitting areas 124 of the optical-collimating layer 120, so that the light-transmitting areas 124 may provide a good optical transmitting effect between the optical-collimating layer 120 and the sensing device 110.

Referring to FIG. 2, a width W1 of the light-transmitting area 124 in the first direction d1 is smaller than or equal to a width of the sensing unit 112 in the first direction d1, and a width W2 of the light-transmitting area 124 in the second direction d2 is smaller than or equal to a width of the sensing unit 112 in the second direction d2. Referring to FIG. 1, the optical-collimating layer 120 of the fingerprint sensing module 100 of the present embodiment can be perfectly matched with a width of the fingerprint 60 of the user 50. Further, a pitch between two adjacent light-blocking regions 122 is substantially the same with a distance $R_{es}$ of the sensing units 112 of sensing device 110 to be resolved (i.e. a width between two adjacent peaks in the fingerprint to be sensed), and the fingerprint sensing module 100 of the present embodiment is complied with $$h_2 \geq \frac{h_1 W}{R_{es} - W},$$

where $h_1$ is a height of the optical cover 130 along a direction parallel to the normal of the sensing surface 111, and $h_2$ is a height of the optical-collimating layer 120 along the direction parallel to the normal of the sensing surface 111, and W is the minimum width of each of the light-transmitting areas 124 along a direction perpendicular to the normal of the sensing surface 111. Therefore, the light-blocking areas 122 of the optical-collimating layer 120 may provide a good light-blocking effect, so as to prevent the scattered light with a large angle to form a noise, and accordingly improve the sensing accuracy of the fingerprint sensing module 100.

On the other hand, the optical-collimating layer 120 of the present embodiment is complied with $$\frac{h_1}{2} \leq h_2 \leq h_1,$$

where $h_1$ and $h_2$ are respectively heights of the optical cover 110 and the optical-collimating layer 120 along the direction parallel to the normal of the sensing surface 111. Therefore, the size of the light-transmitting areas 124 in the optical-collimating layer 120 of the fingerprint sensing module 100 can be perfectly matched with the width of the fingerprint 60 to be detected, so as to provide a good fingerprint detecting effect.

Referring to FIG. 1, in the present embodiment, the optical cover 130 further includes a connection surface 131 and a contact surface 133. The contact surface 133 is adapted to contact the finger of the user 50, and the connection surface 131 is connected to the optical-collimating layer 120, the optical-collimating layer 120 is connected to the sensing surface 111 of the sensing device 110, and the contact surface 133, the connection surface 131 and the sensing surface 111 are parallel to each other. Therefore, the light-blocking areas 122 and the light-transmitting areas 124 of the optical-collimating layer 120 are arranged in alternation between the sensing surface 111 and the connection surface 131 along the direction perpendicular to the normal of the sensing surface 111, so that the sensing light sensed by the sensing surface 111 may accurately correspond to the fingerprint 60 on the contact surface 133.

Figure 3:
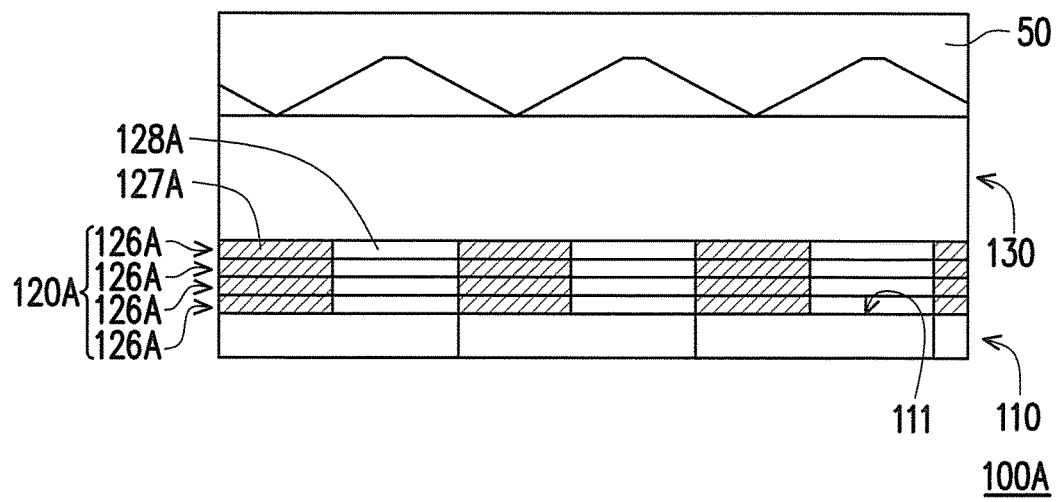
FIG. 3 is a partial enlarged view of a fingerprint sensing module according to a second embodiment of the invention.

The light-blocking areas of the invention are not limited to the configuration method of the light-blocking areas 122 of the optical-collimating layer 120 of the above embodiment. FIG. 3 is a partial enlarged view of a fingerprint sensing module according to a second embodiment of the invention. Referring to FIG. 3, the fingerprint sensing module 100A of the second embodiment of the invention is similar to the fingerprint sensing module 100 of the first embodiment, and a difference there between is that the optical-collimating layer 120A further includes a plurality of optical-collimating sheets 126A stacked along the normal direction of the sensing surface 111, and each of the optical-collimating sheets 126A includes a plurality of light-transmitting portions 128A and a plurality of light-blocking portions 127A. Each of the light-transmitting portions 128A is located at one of the light-transmitting areas, and each of the light-blocking portions 127A is located at one of the light-blocking areas. In other words, the light-blocking areas of the optical-collimating layer 120A are formed by stacking the light-blocking portions 127A of the optical-collimating sheets 126A, and the light-transmitting areas thereof are formed by stacking the light-transmitting portions 128A of the optical-collimating sheets 126A.

Therefore, the optical-collimating layer 120A of the second embodiment of the invention may not only improve the fingerprint sensing accuracy of the fingerprint sensing module 100A, but can also be formed on the sensing surface 111 of the sensing device 110 by stacking a plurality of optical-collimating sheets 126A, so as to reduce a manufacturing difficulty of the fingerprint sensing module 100A.

Figure 4:
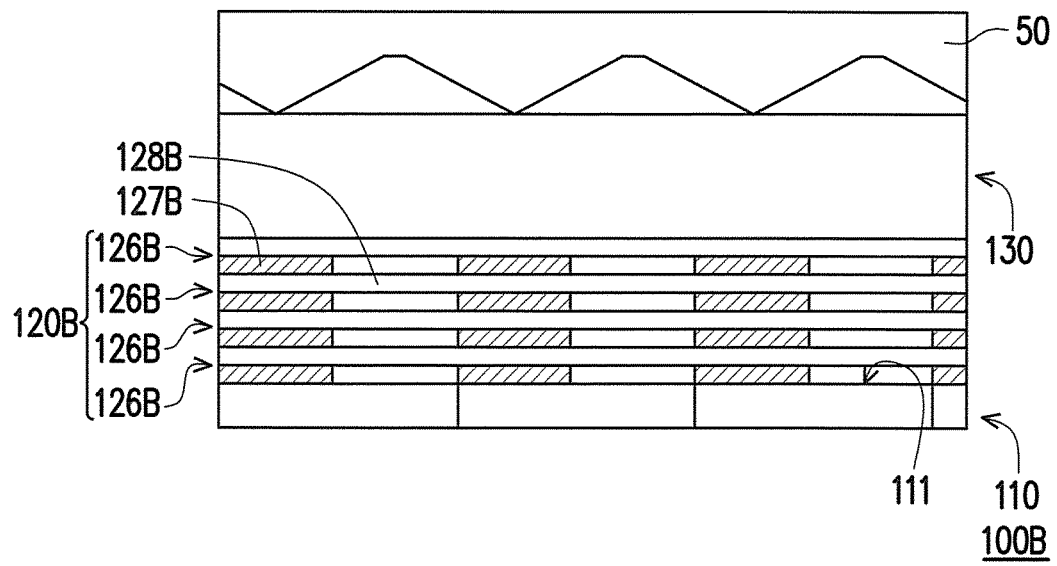
FIG. 4 is a partial enlarged view of a fingerprint sensing module according to other embodiment of the invention.

FIG. 4 is a partial enlarged view of a fingerprint sensing module according to other embodiment of the invention. In the embodiments of the invention, the optical-collimating sheets used for forming the optical-collimating layer of the fingerprint sensing module are not limited to the optical-collimating sheets 126A of the fingerprint sensing module 100A. Referring to FIG. 4, in the other embodiment of the invention, a light-blocking layer 127B can be further printed on the light-transmitting sheets 128B to form a plurality of optical-collimating sheets 126B, so as to stack the optical-collimating layer 128B having a plurality of light-transmitting areas and a plurality of light-blocking areas on the sensing surface 111 of the sensing device 110 to form the fingerprint sensing module 100B. Therefore, the optical-collimating layer 120B of the present embodiment not only improves the sensing accuracy of the fingerprint sensing module 100B, but can also be formed on the sensing surface 111 of the sensing device 110 by stacking a plurality of optical-collimating sheets 126B, so as to decrease a manufacturing difficulty of the fingerprint sensing module 100B.

The optical-collimating sheets of the fingerprint sensing module of the invention is not limited to be printed with the light-blocking layer 127B, but can also be formed by disposing a plurality of light-blocking sheets on the light-blocking portions of the optical-collimating sheets at a side away from the optical cover, which is not limited by the invention.

In summary, since the fingerprint sensing module of the invention has the optical-collimating layer disposed between the optical cover and the sensing device, and the optical-collimating layer has a plurality of light-transmitting areas and a plurality of light-blocking areas surrounding the light-transmitting areas, when the finger of the user is placed on the optical cover, a part of the sensing light coming from the surface of the finger of the user is blocked by the light-blocking areas, such that the sensing device may accurately sense fingerprint images of different places on the surface of the finger of the user.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A fingerprint sensing module, adapted to sense a fingerprint of a finger of a user, the fingerprint sensing module comprising:
a sensing device, comprising a sensing surface;
an optical-collimating layer, covering the sensing surface, and comprising a plurality of light-absorbing areas and a plurality of light-transmitting areas, wherein each of the light-transmitting areas is surrounded by a part of the light-absorbing areas,
wherein the light-absorbing areas of the optical-collimating layer are adapted to absorb the sensing light, and wherein the light-absorbing areas and the light-transmitting areas are arranged in alternation on the sensing surface along a first direction and a second direction, so that the light-absorbing areas and the light-transmitting areas are arranged in a chessboard form, the first direction is perpendicular to the second direction, and the first direction and the second direction are all perpendicular to a normal of the sensing surface; and
an optical cover, disposed on the optical-collimating layer, the optical-collimating layer being disposed between the optical cover and the sensing device, and the optical cover being adapted to contact the finger of the user, wherein the optical cover is adapted to transmit a sensing light from the finger of the user to the optical-collimating layer, and the light-absorbing areas are adapted to absorb a portion of the sensing light, and another portion of the sensing light is transmitted to the sensing surface through the light-transmitting areas.

2. The fingerprint sensing module as claimed in claim 1, wherein the sensing device further comprises a plurality of sensing units, the sensing units are arranged on the sensing surface, and each of the light-transmitting areas corresponds to one of the sensing units.

3. The fingerprint sensing module as claimed in claim 1, wherein the sensing device further comprises a plurality of sensing units, the sensing units are arranged on the sensing surface, a width of the light-transmitting areas in the first direction is smaller than or equal to a width of the sensing units in the first direction, and a width of the light-transmitting areas in the second direction is smaller than or equal to a width of the sensing units in the second direction.

4. The fingerprint sensing module as claimed in claim 1, wherein the optical cover further comprises a connection surface and a contact surface, the contact surface is adapted to contact the finger of the user, and the connection surface is connected to the optical-collimating layer, the sensing surface is connected to the optical-collimating layer, and the contact surface, the connection surface and the sensing surface are parallel to each other.

5. The fingerprint sensing module as claimed in claim 1, wherein the optical-collimating layer and the optical cover are complied with:

$$\frac{h_1}{2} \leq h_2 \leq h_1,$$

wherein $h_1$ and $h_2$ are respectively heights of the optical cover and the optical-collimating layer along a direction parallel to a normal of the sensing surface.

6. The fingerprint sensing module as claimed in claim 1, further comprising:
at least one light-emitting unit, adapted to send the sensing light to a surface of the finger of the user.

7. The fingerprint sensing module as claimed in claim 1, wherein the optical-collimating layer further comprises a plurality of optical-collimating sheets, and each of the optical-collimating sheets comprises a plurality of light-transmitting portions and a plurality of light-blocking portions, each of the light-transmitting portions is located at one of the light-transmitting areas, and each of the light-blocking portions is located at one of the light-absorbing areas, and the optical-collimating sheets are stacked along a normal direction of the sensing surface.

8. The fingerprint sensing module as claimed in claim 7, further comprising:
a plurality of light-blocking sheets, disposed on the light-blocking portions of the optical-collimating sheets at a side away from the optical cover.

9. A fingerprint sensing module, adapted to sense a fingerprint of a finger of a user, the fingerprint sensing module comprising:
a sensing device, comprising a sensing surface;
an optical-collimating layer, covering the sensing surface, and comprising a plurality of light-blocking areas and a plurality of light-transmitting areas, wherein each of the light-transmitting areas is surrounded by a part of the light-blocking areas,
wherein the optical-collimating layer further comprises a plurality of optical-collimating sheets, and each of the optical-collimating sheets comprises a plurality of light-transmitting portions, a plurality of light-blocking portions, and a light-transmitting sheet, each of the light-transmitting portions is located at one of the light-transmitting areas, each of the light-blocking portions is located at one of the light-blocking areas, and the light-blocking portions and the light-transmitting sheets are alternately stacked along a normal direction of the sensing surface so the optical-collimating sheets are stacked along the normal direction of the sensing surface;

an optical cover, disposed on the optical-collimating layer, the optical-collimating layer being disposed between the optical cover and the sensing device, and the optical cover being adapted to contact the finger of the user, wherein the optical cover is adapted to transmit a sensing light from the finger of the user to the optical-collimating layer, and the light-blocking areas are adapted to block a portion of the sensing light, and another portion of the sensing light is transmitted to the sensing surface through the light-transmitting areas; and a plurality of light-blocking sheets, disposed on the light-blocking portions of the optical-collimating sheets at a side away from the optical cover.

\* \* \* \* \*